Patented Nov. 9, 1943

2,333,658

UNITED STATES PATENT OFFICE 2,333,658

ANTIOXIDANT FOR FATS AND OILS

Henry A. Mattill and Calvin Golumbic, Iowa City, Iowa, assignors to Lever Brothers Company, Cambridge, Mass., a corporation of Maine No Drawing. Application June 22, 1942, Serial No. 448,006

18 Claims. (Cl. 260—398.5)

This invention relates to the preservation or stabilization of oils and fats, and food products containing oils and fats, by retarding the oxidation and the development of rancidity therein; the invention also relates to oils, fats and food products so stabilized and to the materials used therein.

It is well known that oils and fats often become rancid, which, in the case of edible oils and fats or products containing the same, renders them unfit for human consumption. This is particularly true when the oils and fats have been subjected to refining or processing operations, or are stored for an appreciable time before they are used. It is desirable to prevent those changes which result in rancidity, or at least to postpone them to such an extent that the oils and fats may be utilized before any undesirable action takes place.

It is an object of the invention to provide a practical method for preserving food substances and particularly oils and fats, by the addition thereto of a small amount of at least two materials which act together to prevent or postpone injurious oxidation and rancidity changes.

It is a further object of this invention to employ small amounts of two or more materials which, when used together, exert a synergistic antioxidant action. That is, the antioxidant effect obtained by the two or more materials is much greater than the sum of the antioxygenic effects, if any, of the several materials when used separately.

An additional object of the invention is to accomplish this stabilizing action of oils and fats without the use of harmful chemicals or adulterants, but rather by means of harmless ingredients and which in some cases are desirable from the nutritional standpoint.

In particular, it is an object of the invention to preserve or stabilize oils and fats and food substances containing the same by the incorporation therein of a relatively small amount of a hexuronic acid in association with certain hereinafter defined chroman type compounds, or with certain hereinafter defined quinone type compounds or with both of them.

The fats and oils to which the invention is applicable are those comprising glycerides of fatty acids, particularly unsaturated fatty acids. They may be obtained from the naturally occurring sources, such as animal or vegetable oils and fats or from synthetic sources. Lard, in particular, is an example of a fat from an animal source that has a tendency to turn rancid and is, therefore, improved as to keeping qualities by the addition of an antioxidant. Vegetable oils, such as cottonseed oil, coconut oil, palm oil, sesame oil, soybean oil, peanut oil, sunflowerseed oil, olive oil, etc., are examples of vegetable oils to which an antioxidant may be added. Vegetable oils are generally subjected to refining operations which may remove some naturally occurring antioxidants, but not others, or may reduce them in amount. Shortenings of the dry plastic type comprised of partially hydrogenated refined vegetable oils may also be protected by antioxidants, as well as similar shortenings produced by compounding an oil with a hard fat.

Some of the constituents of oils and fats are well known in chemistry to possess a tendency to absorb and react with oxygen. The development of rancidity results primarily from the products formed during oxidation. The dissolved or absorbed oxygen usually reacts first to form fatty acid peroxides. The development of the peroxides may be accelerated by moisture, heat, light or catalysts. Aldehydes, ketones and acids of lower molecular weight may be formed among others in the further decomposition and these materials impart an undesirable odor and taste to the oil or fat.

The efficiency of an antioxidant may be expressed in terms of the resistance of an oil or fat to the absorption of oxygen. When an oxidizable oil or fat is exposed to oxygen or air under standardized conditions, a definite time interval elapses before there is an appreciable absorption of oxygen by the oil or fat. This interval is termed the "induction period." It is possible, therefore, to denote the action of an antioxidant in terms of its ability to prolong the induction period. This method has been standardized and can be carried out conveniently by a comparison of the stabilized oil or fat with a control, i. e., an oil or fat not containing an antioxidant but which has been otherwise treated unded like conditions. Such a test may be employed in evaluating the hexuronic acids in association with the chroman and quinone type compounds as antioxidants, and will be referred to in denoting the extent of the antioxidant action.

Another satisfactory method of evaluating antioxidants proved to be the use of methyl or ethyl esters of the fatty acids of the oil or fat. As illustrative of their preparation, two parts of absolute alcohol containing 2% to 3% of hydrogen chloride is added to one part of the oil or fat, and the mixture is refluxed on a steam bath for 18 to 24 hours. The mixture is then cooled and diluted with water. The ester layer is washed repeatedly with water to remove the hydrochloric acid and alcohol, then centrifuged free from occluded water, and finally heated on a steam bath in a vacuum to remove any traces of solvents. The remaining liquid contains the ethyl esters of the fatty acids, the unsaponifiable constituents of the original oil or fat, and possibly traces of unhydrolyzed glycerides. The glycerol and any water-soluble constituents will have been removed.

The product so obtained from lard or a partially hydrogenated cottonseed oil, for example, could be used to assay antioxidants by the oxygen absorption method, since the product has a convenient induction period and a rapid rate of oxygen absorption at the end of the induction period. Furthermore, the protection offered to the product by various antioxidants was qualitatively parallel to that conferred upon the original fat.

Other materials that can be used in determining the effectiveness of antioxidants include the fatty acids of oils and fats, and the distilled esters of oils and fats.

As has been mentioned heretofore, some of the products formed in the early stages of the oxidation of oils and fats are fatty acid peroxides, and the extent of the oxidation of an oil or fat can be determined from its peroxide content. Thus the effectiveness of an antioxidant added to suppress or delay oxidation can be denoted in terms of the amount of peroxides formed or their absence. This method has been standardized and the peroxide number of an oil or fat containing an antioxidant, after being exposed to oxygen or air under standardized conditions for a given time, can be expressed in millimols of oxygen and can be used to evaluate the antioxidant action.

While in general it is preferred to indicate the antioxidant efficiency in terms of the induction period, there may be certain instances where a designation in terms of peroxide value will be more advantageous or revealing. The peroxide method of determining and indicating antioxidant efficiency is also employed in designating the results obtained in accordance with the invention.

The hexuronic acids utilized in accordance with the invention have the general formula:

CHO(CHOH)₄COOH 

The more readily available hexuronic acids may be illustrated by glucuronic and galacturonic acids. These acids as well as the other hexuronic acids are stereo-isomers.

The hexuronic acids are to be distinguished particularly from the sugar acids as illustrated by gluconic, galactonic and mannonic acids, all of which have the formula:

HOCH₂(CHOH)₄COOH 

None of these sugar acids contain the aldehyde group characteristic of the hexuronic acids. Experiments with compounds closely related to hexuronic acids, such as pectic acid and pectin, not containing the free aldehyde group, indicate that the latter is essential for an antioxidant action of the nature and type obtained in accordance with the invention.

We have discovered that the simultaneous inclusion in an oil or fat of a hexuronic acid with a quinone type compound as hereinafter defined; or with a chroman type compound as hereinafter defined; or with both, results in a synergistic action by means of which a pronounced antioxidant effect is obtained. In other words when the hexuronic acid and the quinone type compound are employed together, or when the hexuronic acid and the chroman type compound are employed together, or when all three compounds are used together, the antioxygenic effect obtained by the use of these combined materials is appreciably more than the additive antioxygenic effects of the compounds, if any, when employed separately. We believe this to be unexpected from any consideration of the properties of the individual compounds.

The quinone type of compounds comprise the naphthols, quinones and quinols including the α-naphthols, such as 2-methyl-1-naphthol, 3-methyl-1-naphthol, the α-naphthoquinones, the α-naphthohydroquinones, the alkyl-substituted naphthohydroquinones, such as 2-methyl-1,4-naphthohydroquinone, the benzoquinones and corresponding quinols, such as p-xyloquinone, p-xylohydroquinone, the β-naphthoquinones, the lapachones, such as β-lapachone and dehydroiso-β-lapachone.

The chroman type compounds comprise the class of chromans including the hydroxychromans, such as the 6-hydroxychromans, the α-β-γ-tocopherols, and the alkyltocols, such as 5,7-dimethyltocol; the chromens including the hydroxychromens, such as the 6-hydroxychromens and alkyl-substituted compounds, i. e., 6-hydroxy-2,2,4 trimethyl chromen, the coumarones including the hydroxycoumarones, such as the 5-hydroxycoumarones and alkyl-substituted compounds such as 5-hydroxy-2,4,6,7 tetramethyl coumarone, the coumarans including the hydroxycoumarans, such as the 5-hydroxycoumarans and alkyl-substituted compounds, i. e., 5-hydroxy 2, 4, 6,7-tetramethyl coumaran, and the isocoumaranones and hydroxyisocoumaranones and aromatic and alkyl substituted compounds, such as the 5- and 7-hydroxyisocoumaranones, 3-phenyl isocoumaranone, 5-hydroxy-4, 6, 7 trimethyl isocoumaranone, 5-hydroxy-3-phenyl isocoumaranone, and 7-hydroxy 3-phenyl isocoumaranone, and the chroman-5,6-quinones and their precursors which are associated with vitamin E.

All of the compounds noted in the previous two paragraphs are cyclic oxy compounds, and thus are similar.

Some of the compounds which we use synergistically as antioxidants with the hexuronic acids are also known as vitamins; others are closely related chemically. The synergistic antioxidant action of the compounds used is to be distinguished from their physiological action and the fact that they have a vitaminic action is more or less incidental in so far as the invention is concerned. The amounts employed also are so small that an oil or fat stabilized with the compounds used would not be a good source for any vitamins needed by the body. In addition certain of the compounds, very closely related chemically, function as synergistic antioxidants in accordance with the invention, but do not have the physiological effect of the vitamins. This confirms the suggestion that the vitaminic action of certain of the antioxidants used in accordance with the invention is without significance. It is a desirable feature of the invention, however, that the antioxidants used are vitamins or closely related compounds, because their use does not introduce a deleterious chemical into the oil or fat. This is important when the oil or fat is intended for human consumption.

In considering the synergistic effect, it is necessary to keep in mind that certain naturally occurring fats and oils, particularly those from certain vegetable sources, contain a small amount of tocopherol as a natural ingredient. Thus when a hexuronic acid is added to a fat naturally containing a tocopherol, the antioxidant effect is the result of the synergistic action of the hexuronic acid and the tocopherol. Similarly, if both a hexuronic acid and a quinone type compound are added to an oil or fat naturally containing a tocopherol, the antioxidant effect will be the result of the synergistic action of all three materials. The same may be said for the methyl or ethyl esters of oils or fats naturally containing a tocopherol.

Lard is a fat which does not naturally contain any of the antioxidants of the type herein described as useful in accordance with the invention, or at least not in a significant amount. For this reason lard is a more or less ideal substrate in which to test the effect of the antioxidants individually and to demonstrate the synergistic action of two or more of the antioxidants when used together in the manner described heretofore. In the case of lard, or the methyl or ethyl esters thereof, which do not contain any tocopherol as a natural ingredient, it is necessary to add a tocopherol when a synergistic antioxidant effect is desired in which tocopherol is to play a part.

When tocopherol is to be utilized for its antioxidant effect in accordance with the invention, it is immaterial whether it is present as a naturally occurring ingredient or whether it is added; the invention contemplates either. In those instances where a tocopherol is naturally present, and in an amount sufficient for the purpose, it would not be necessary to add an additional quantity from an outside source in order to secure the synergistic effect in which it plays a role. In instances where a tocopherol is naturally present, but not in a sufficient amount, it may be supplemented.

As illustrative of the invention, utilizing lard as a substrate, the antioxidants shown in the table below were incorporated in lard in the amounts indicated, and the antioxygenic action is designated in terms of an antioxygenic index which is the ratio of the length of the induction period of the fat with added stabilizer to the length of the induction period of the fat without stabilizer. By way of example, if the induction period of a large sample under the conditions (at 70° in an atmosphere of oxygen) is 10 hours, that of a sample of lard to which 0.10% of galacturonic acid has been added is also 10 hours, whereas the addition of 0.03% of natural tocopherol prolongs the induction period to 17 hours, giving an index of 1.7. The index for a stabilizer or for a set of stabilizers is usually the average of several determinations.

Table I

| Substrate | Antioxidant | Antioxygenic index |
|---|---|---|
| Lard | 0.10% galacturonic acid | 1.7 |
| Do | 0.03% natural tocopherol | 1.7 |
| Do | 0.03% natural tocopherol+0.10% galacturonic acid. | 2.8 |
| Do | 0.02% synthetic α-tocopherol | 2.8 |
| Do | 0.02% synthetic α-tocopherol+0.10% galacturonic acid. | 7.5 |
| Do | 0.01% β-tocopherol | 5.0 |
| Do | 0.01% β-tocopherol + 0.10% galacturonic acid. | 17.5 |
| Do | 0.02% red quinoid oxidation product of α-tocopherol. | 4.5 |
| Do | 0.02% red quinoid oxidation product+0.10% galacturonic acid. | 7.0 |
| Do | 0.02% 1,4-naphthohydroquinone | 1.3 |
| Do | 0.02% 1,4-naphthohydroquinone+0.10% galacturonic acid. | ¹3.5+ |
| Do | 0.1% 1,4-naphthoquinone | 1.4 |
| Do | 0.1% 1,4-naphthoquinone+0.10% galacturonic acid. | ¹5.4+ |
| Do | 0.1% 2-methyl-1,4-naphthohydroquinone+0.1% galacturonic acid. | 3. |
| Do | 0.1% 2-methyl-1,4-naphthohydroquinone+0.1% galacturonic acid+0.02% α-tocopherol. | 9.5 |
| Do | 0.1% 2-methyl-1,4-naphthohydroquinone. | 1.5 |

¹ Fresh when discontinued.

From the above table it will be noted that synergistic action results from the use of galacturonic acid with the chroman type compound such as the α- and β-tocopherol, the chroman 5,6-quinone (the red oxidation product resulting from the oxidation of tocopherol), and quinones as exemplified by naphthoquinones and naphthohydroquinones.

The data in the following table are illustrative of the antioxygenic effect with the ethyl esters of lard as a substrate:

Table II

| Substrate | Antioxidant | Induction period in hours |
|---|---|---|
| Ethyl esters of lard | None | 4 |
| Do | 0.02% α-naphthol | 74 |
| Do | 0.1% galacturonic acid+0.02% α-naphthol. | ¹240++ |

¹ Fresh when discontinued.

In the above table data are not included as to the action of galacturonic acid on lard esters, since it was established by other tests that galacturonic acid does not exert any appreciable antioxidant action by itself.

As illustrative of the applicability of the invention to a dry plastic shortening made from a hydrogenated vegetable oil, the several antioxidants mentioned herein were incorporated in such a shortening. Since this contains about 0.1% of the naturally occurring tocopherol by analysis, the mere addition of galacturonic acid results in an antioxidant effect which is the synergistic action of the tocopherol and the galacturonic acid, similarly the addition of the quinone type compound and galacturonic acid to the shortening results in an antioxidant effect which is the synergistic action of tocopherol, galacturonic acid and the quinone. The results, in terms of peroxide value, are shown in the following table:

nated vegetable oil in which is included a small amount of a hexuronic acid and a tocopherol.

Table III

| Substrate | Antioxidant | Peroxide value (average of two samples) | | | |
|---|---|---|---|---|---|
| | | 7th day | 16th day | 19th day | 26th day |
| Hydrogenated vegetable oil | 0.10% N. o.¹ tocopherol | 13.7 | Rancid (10th day) | | Rancid. |
| Do | 0.10% N. o.¹ tocopherol+0.05% galacturonic acid | 8.4 | 13.0 | 14.8 | |
| Do | 0.10% N. o.¹ tocopherol+0.05% 2-methyl-1,4-naphthohydroquinone | 8.6 | 15.2 | Rancid (18th day) | |
| Do | 0.10% N. o.¹ tocopherol+0.05% galacturonic acid+ 0.05% 2-methyl-1,4 naphthohydroquinone | 5.8 | 10.7 | 11.9 | 17.3 |

¹ Naturally occurring.

The amounts used are not particularly critical and relatively small amounts can be used; there is probably no minimum of any substantial amount which will not yield some result. The use of more than is necessary would not be economical. For commercial purposes it is probably desirable to have the compounds in the amount of from 0.005% to 0.1%.

The chemistry involved in the coaction of the compounds is not entirely understood, but certain observations indicate that the synergistic action may be attributed to the potentials of compounds. However, having fully disclosed our invention, and the manner in which it may be practiced, we do not wish to be limited to any theory of operation.

The chroman and quinone type compounds are oil-soluble and include the oil-soluble vitamins E and K respectively. The hexuronic acids while water-soluble are nevertheless utilized in the oil itself when the invention is applied to the preferred embodiment, i. e., a dry plastic shortening. This is to be distinguished from oil and water emulsions in which the water-soluble antioxidants would be present in the water phase, and the oil-soluble vitamins would be present in the oil or fat phase.

It will be obvious that our invention contemplates numerous alternative and equivalent embodiments other than those specifically mentioned as illustrative, and all of the same are intended to be included within the invention as claimed hereinafter.

We claim:

1. A composition of matter comprising an oleaginous material in which is included a small amount of a hexuronic acid and a cyclic oxy compound selected from the group consisting of quinones, hydroquinones, naphthoquinones, naphthols, naphthohydroquinones, chromans, chromens, coumarones and coumarans.

2. A composition of matter comprising an oleaginous material in which is included a small amount of a hexuronic acid and an alkyl substituted hydroxy chroman.

3. A composition of matter comprising an oleaginous material in which is included a small amount of a hexuronic acid and a quinone.

4. A composition of matter comprising a dry, plastic, edible shortening formed from hydrogenated vegetable oil in which is included a small amount of a hexuronic acid and cyclic oxy compound selected from the group consisting of quinones, hydroquinones, naphthoquinones, naphthols, naphthohydroquinones, chromans, chromens, coumarones and coumarans.

5. A composition of matter comprising a dry, plastic, edible shortening formed from hydrogenated vegetable oil in which is included a small amount of a hexuronic acid and a tocopherol.

6. A composition of matter comprising a dry, plastic, edible shortening formed from hydrogenated vegetable oil in which is included a small amount of a hexuronic acid and a naphthohydroquinone.

7. A composition of matter comprising an oleaginous material in which is included a small amount of a hexuronic acid, a compound selected from the group consisting of chromans, chromens, coumarones, and coumarans, and a compound selected from the group consisting of quinones, hydroquinones, napthoquinones, naphthohydroquinones and naphthols.

8. A composition of matter comprising a dry, plastic, edible shortening formed from hydrogenated vegetable oil in which is included a small amount of a hexuronic acid, an alkyl substituted hydroxychroman and a quinone.

9. A composition of matter comprising a dry, plastic, edible shortening formed from hydrogenated vegetable oil in which is included a small amount of a hexuronic acid, a tocopherol, and a naphthohydroquinone.

10. A composition of matter comprising a dry, plastic, edible shortening formed from hydrogenated vegetable oil in which is included a small amount of galacturonic acid, vitamin E and vitamin K.

11. A process of inhibiting oxidation and development of rancidity in oleaginous material which comprises adding thereto a small amount of a hexuronic acid, and a cyclic oxy compound selected from the group consisting of quinones, hydroquinones, napthoquinones, naphthols, naphthohydroquinones, chromans, chromens, coumarones and coumarans.

12. A process of inhibiting oxidation and development of rancidity in oleaginous material which comprises adding thereto a small amount of a hexuronic acid and an alkyl substituted hydrochroman.

13. A process of inhibiting oxidation and development of rancidity in oleaginous material which comprises adding a small amount of a hexuronic acid and a quinone.

14. A process of inhibiting oxidation and development of rancidity in oleaginous material containing a naturally occurring tocopherol comprising adding a small amount of a hexuronic acid.

15. A process of inhibiting oxidation and development of rancidity in oleaginous material containing a naturally occurring tocopherol comprising adding a small amount of a hexuronic acid and a naphthohydroquinone.

16. A composition of matter comprising a dry, plastic, edible shortening formed from hydrogenated vegetable oil in which is included 0.005% to 0.1% each of a hexuronic acid and a cyclic oxy compound selected from the group consisting of quinones, hydroquinones, napthoquinones, naphthols, naphthohydroquinones, chromans, chromens, coumarones and coumarans.

17. A composition of matter comprising a dry, plastic, edible shortening formed from a hydrogenated vegetable oil in which is included 0.005% to 0.1% each of a hexuronic acid and a tocopherol.

18. A composition of matter comprising a dry, plastic, edible shortening formed from hydrogenated vegetable oil in which is included 0.005% to 0.1% each of a hexuronic acid and a naphthohydroquinone.

HENRY A. MATTILL.
CALVIN GOLUMBIC.

CERTIFICATE OF CORRECTION.

Patent No. 2,333,658. November 9, 1943.

HENRY A. MATTILL, ET AL.

It is hereby certified that error appears in the printed specification of the above numbered patent requiring correction as follows: Page 4, second column, line 58, claim 12, for "hydrochroman" read --hydroxychroman--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.